(12) United States Patent
Luckett, Jr. et al.

(10) Patent No.: US 9,992,210 B2
(45) Date of Patent: Jun. 5, 2018

(54) SYSTEM AND METHOD FOR INTRUSION DETECTION AND SUPPRESSION IN A WIRELESS SERVER ENVIRONMENT

(71) Applicant: MYTH INNOVATIONS, INC., Dallas, TX (US)

(72) Inventors: James Albert Luckett, Jr., Dallas, TX (US); Chad Michael Rowlee, Hixson, TN (US); Robert Michael Brooks, Jr., Plano, TX (US)

(73) Assignee: MYTH INNOVATIONS, INC., Dallas, TX (US)

( * ) Notice: Subject to any disclaimer, the term of this patent is extended or adjusted under 35 U.S.C. 154(b) by 0 days. days.

(21) Appl. No.: 14/728,977

(22) Filed: Jun. 2, 2015

(65) Prior Publication Data

US 2015/0381636 A1 Dec. 31, 2015

Related U.S. Application Data

(60) Provisional application No. 62/006,817, filed on Jun. 2, 2014, provisional application No. 62/045,501, filed on Sep. 3, 2014.

(51) Int. Cl.
*H04L 29/06* (2006.01)
*H04W 12/12* (2009.01)

(52) U.S. Cl.
CPC ......... *H04L 63/1416* (2013.01); *H04W 12/12* (2013.01); *H04L 63/1466* (2013.01); *H04L 63/1491* (2013.01)

(58) Field of Classification Search
CPC . H04L 63/1416; H04L 63/1466; H04W 12/12
See application file for complete search history.

(56) References Cited

U.S. PATENT DOCUMENTS 6,978,223 B2 * 12/2005 Milliken ............... H04L 41/046
702/122
8,922,590 B1 12/2014 Luckett, Jr. et al.

OTHER PUBLICATIONS

Kim et al. (Agent-based honeynet framework for protecting servers in campus networks, IET Inf. Secur., 2012, vol. 6, Iss. 3, pp. 202-211).*
Hu et al., (Packet Leashes: A Defense against Wormhole Attacks in Wireless Networks, 2003 IEEE, pp. 1976-1986).*
https://en.wikipedia.org/wiki/Cryptographic hash function, 9 pages, retrived Jan. 19, 2017.*
Common Terms Used in Patent Claim Language _ IntellectualPropertyLawFirms, 2 pages, retrieved Jan. 19, 2017.*

* cited by examiner

*Primary Examiner* — Oleg Korsak
(74) *Attorney, Agent, or Firm* — Jackson Walker LLP; Christopher J. Rourk

(57) ABSTRACT

A system for data communications includes a port scan detector, a decoy port system, a data packet hash manager, an encapsulated artificial intelligence system and an offensive code system configured to implant offensive code in the sending device and to control operation of the sending device if the sending device is the hostile device, if the sending device is not operating the has increment system and if the data communications are not consistent with the levelling algorithm.

14 Claims, 2 Drawing Sheets

SYSTEM AND METHOD FOR INTRUSION DETECTION AND SUPPRESSION IN A WIRELESS SERVER ENVIRONMENT

RELATED APPLICATIONS

The present application claims priority to and benefit of U.S. Provisional Patent Application No. 62/006,817, filed on Jun. 2, 2014, which is hereby incorporated by reference for all purposes as if set forth herein in its entirety.

TECHNICAL FIELD

The present disclosure relates generally to data communications, and more specifically to a system and method for intrusion detection and suppression in a wireless server environment.

BACKGROUND OF THE INVENTION

Wireless access points such as 802.xx-compliant gateways and routers traditionally provide minimal security. Because such devices have minimal processing capability, they are usually unable to use more than password and encryption security protocols.

SUMMARY OF THE INVENTION

A system for data communications comprising a port scan detector configured to receive port access requests from a plurality of ports and to determine whether a port scan by a hostile device is in progress. A decoy port system configured to open a designated decoy port if the port scan detector determines that the port scan by a hostile device is in progress. A data packet hash manager configured to read a series of hash data fields in a corresponding series of data packets and to generate a flag if a sending device is not operating a hash increment system. An encapsulated artificial intelligence system configured to receive the flag and to monitor data communications from the sending device to determine whether the data communications are consistent with a levelling algorithm. An offensive code system configured to implant offensive code in the sending device and to control operation of the sending device if the sending device is the hostile device, if the sending device is not operating the hash increment system and if the data communications are not consistent with the levelling algorithm.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
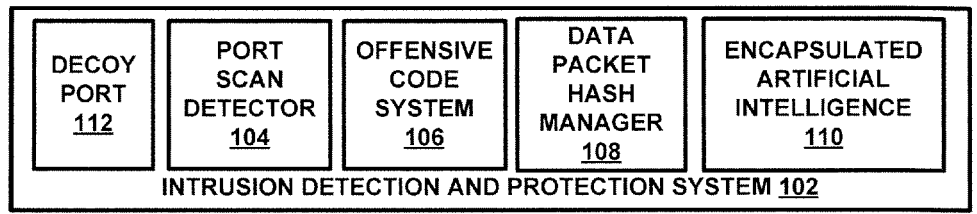
FIG. 1 is a diagram of a system for intrusion detection and protection in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for intrusion detection and protection in accordance with an exemplary embodiment of the present disclosure. System 100 includes intrusion detection and protection system 102, decoy port 112, port scan detector 104, offensive code system 106, data packet hash manager 108 and encapsulated artificial intelligence system 110, each of which can be implemented in hardware or a suitable combination of hardware and software, and can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Intrusion detection and protection system 102 monitors data communications to detect unauthorized access and use of a wireless server device or other devices that are accessing the wireless server device. In one exemplary embodiment, a mobile wireless server device can provide both data communications and data processing for a plurality of associated devices, such as a smart telephone, a tablet computer, a personal data monitoring device, a set top box, a head mounted display or other suitable systems, and can be subjected to attacks from hostile devices. Intrusion detection and protection system 102 detects hostile attacks that are directed to using data communications of the mobile wireless server device or attempts to access data or software systems of the mobile wireless server device or of any of the associated devices and implants offensive code into the hostile device, to allow instruction detection and protection system 102 to take over control of the hostile device.

Decoy port 112 is a communications port of a mobile wireless server device that is used to detect attacks from hostile devices. In one exemplary embodiment, decoy port 112 can be configured to be readily accessible, so as to form a "honey pot" or other readily-accessible port for a hostile device to access. Decoy port 112 can be reserved for detection of hostile devices, can be opened in response to detection of a port scan, or can be configured for other suitable operations.

Port scan detector 104 monitors communications ports and generates a flag or other suitable data if port scanning activity is detected. In one exemplary embodiment, port scan detector 104 can detect access attempts or requests that are sent to two or more wireless access ports or a wireless server device from a wireless device, such as by monitoring the address of the sending device at each port, the device identifier of the sending device at each port, attempts by the wireless device to establish data communications at two or more ports, or other suitable data.

Offensive code system 106 is configured to select an offensive code package as a function of the operating system, device identifier and other characteristics of a hostile device. In one exemplary embodiment, after a hostile device has established data communications with a mobile wireless server device, the operating system, board support package (BSP) or other suitable data of the hostile device can be detected by offensive code system 106, which can then select a suitable type of code to exploit a known vulnerability of the hostile device. Offensive code system 106 can then take over operations of the hostile device, such as by encrypting some or all of the data of the hostile device, by actuating a sound generating system of the hostile device to allow it to be detected by an operator, or in other suitable manners. Offensive code system 106 can also include a deactivation system, to allow any offensive code to be removed after the hostile device has been located and neutralized.

Data packet hash manager 108 monitors data communications received from a device and determines whether the device has implemented a hash algorithm. In one exemplary embodiment, the hash algorithm can be used to encrypt data communications, and can be incremented in successive data packets, such as based on a stored value at the wireless device that is continuously updated. In this exemplary embodiment, if a wireless device initiates data communications with a mobile wireless server and fails to utilize the hash algorithm, the failure can be detected by monitoring a series of successive data packets, and a flag or other suitable data can be generated to indicate that the device is a hostile device.

Encapsulated artificial intelligence system 110 monitors data access and applications access by a user of a mobile wireless server or other devices that access the mobile wireless server to determine whether the user is an authorized user. In one exemplary embodiment, encapsulated artificial intelligence system 110 can utilize a leveling algorithm or other suitable algorithms that determine whether the data, systems or other parameters of a device are likely to be associated with an authorized user. If it is determined that the user is likely unauthorized, a data flag or other suitable alert can be generated.

In operation, system 100 provides security for a mobile wireless server or other suitable devices to detect access by hostile devices and to install offensive code in the hostile device, to allow the hostile device to be neutralized. In this manner, system 100 provides additional security for a mobile wireless server or other suitable devices that have sufficient computing power to monitor data communications, detect hostile attacks and to select offensive code, unlike wireless routers or wireless access points that lack sufficient processing power to perform such functions.

Figure 2:
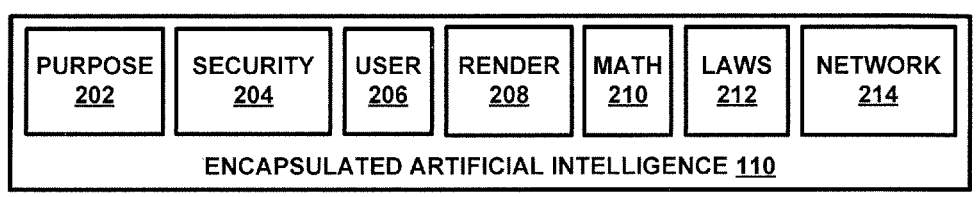
FIG. 2 is a diagram of a system for providing encapsulated artificial intelligence for paradigm-specific operation, in accordance with an exemplary embodiment of the present disclosure.

FIG. 2 is a diagram of a system 200 for providing encapsulated artificial intelligence for paradigm-specific operation, in accordance with an exemplary embodiment of the present disclosure. System 200 includes encapsulated artificial intelligence 110 and purpose 202, security 204, user 206, render 208, math 210, laws 212 and network 214, each of which can be implemented in hardware or a suitable combination of hardware and software, and can be one or more software systems operating on one or more processors.

Purpose 202 includes a plurality of algorithms that are used to identify the purpose for a mobile wireless server or other suitable devices. In one exemplary embodiment, purpose 202 can include algorithms for conserving energy usage, controlling a temperature of one or more devices, maintaining a network connection with one or more devices, providing alerts to a user through a device that the user is presently using or other suitable algorithms. The algorithms can also or alternatively be utilized for other parameters of system 200, such as security 204, user 206, render 208, math 210, laws 212 and network 214.

Security 204 includes a plurality of algorithms that are used to identify security for a mobile wireless server or other suitable devices. In one exemplary embodiment, security 204 can include algorithms for monitoring ports, monitoring data communications, detecting hostile devices or other suitable algorithms. The algorithms can also or alternatively be utilized for other parameters of system 200, such as purpose 202, user 206, render 208, math 210, laws 212 and network 214.

User 206 includes a plurality of algorithms that are used to identify a user or users of a mobile wireless server or other suitable devices. In one exemplary embodiment, user 206 can include algorithms for identifying a primary user, for determining which user is using which device, for monitoring data for the primary user or other suitable algorithms. The algorithms can also or alternatively be utilized for other parameters of system 200, such as purpose 202, security 204, render 208, math 210, laws 212 and network 214.

Render 208 includes a plurality of algorithms that are used to identify virtual reality rendering for a mobile wireless server or other suitable devices. In one exemplary embodiment, render 208 can include algorithms for creating a mobile grid for locating real world devices, for generating tags for real or virtual objects, for locating the tags or virtual objects in a head mounted display or other suitable display or other suitable algorithms. The algorithms can also or alternatively be utilized for other parameters of system 200, such as purpose 202, security 204, user 206, math 210, laws 212 and network 214.

Math 210 includes a plurality of algorithms that are used to perform mathematical functions for a mobile wireless server or other suitable devices. In one exemplary embodiment, math 210 can include algorithms for encrypting and decrypting data, for rendering graphical objects for a head mounted display, for generating probability data or other suitable algorithms. The algorithms can also or alternatively be utilized for other parameters of system 200, such as purpose 202, security 204, user 206, render 208, laws 212 and network 214.

Laws 212 include a plurality of algorithms that are used to create laws for a mobile wireless server or other suitable devices. In one exemplary embodiment, laws 212 can include algorithms for preventing the mobile wireless server from taking actions (e.g. executing a trade using a user's user ID and password for a financial account) or other suitable algorithms. The algorithms can also or alternatively be utilized for other parameters of system 200, such as purpose 202, security 204, user 206, render 208, math 210 and network 214.

Network 214 includes a plurality of algorithms that are used to control a network for a mobile wireless server or other suitable devices. In one exemplary embodiment, network 214 can include algorithms for maintaining network connections, for allocating bandwidth to devices, for utilizing network connections of devices or other suitable algorithms. The algorithms can also or alternatively be utilized for other parameters of system 200, such as purpose 202, security 204, user 206, render 208, math 210 and laws 212.

In addition, purpose 202, security 204, user 206, render 208, math 210, laws 212 and network 214 can be used as a single leveling algorithm, to authenticate a user, the use of the mobile wireless server, access by a device or other suitable functions or devices. In this manner, unauthorized use of the mobile wireless server can be quickly detected, and appropriate countermeasures can be implemented to neutralize the hostile device or devices before they access sensitive data or take control of the mobile wireless server.

Figure 3:
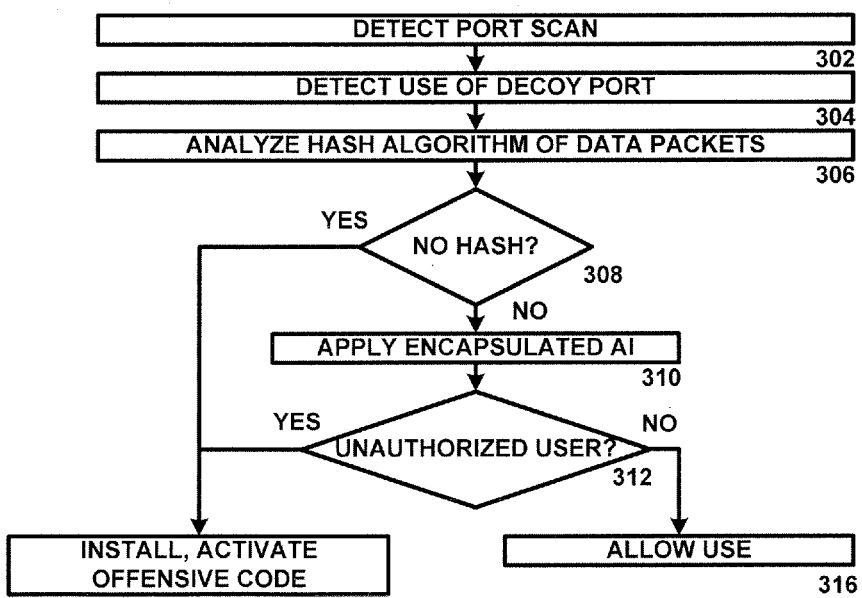
FIG. 3 is a diagram of an algorithm for intrusion detection and protection in accordance with an exemplary embodiment of the present disclosure.

FIG. 3 is a diagram of an algorithm 300 for intrusion detection and protection in accordance with an exemplary embodiment of the present disclosure. Algorithm 300 can be implemented in hardware or a suitable combination of hardware and software, and can be one or more software systems operating on one or more processors.

Algorithm 300 begins at 302, where a port scan is detected. In one exemplary embodiment, the port scan can be detected by comparing parameters received at each of a plurality of ports of a mobile wireless server to determine if the same device is checking the ports for a weakness or other attempts to access the ports. The algorithm then proceeds to 304.

At 304, it is determined whether a decoy port is being used by a potentially hostile device. In one exemplary embodiment, a decoy port can be enabled in response to a detected port scan to determine whether the potentially hostile device is looking for an easy port to attack. In another exemplary embodiment, the decoy port can be continuously enabled and monitored, or other suitable processes can also or alternatively be used. The algorithm then proceeds to 306.

At 306, a data field of a series of data packets or other suitable data is analyzed to determine whether a hash algorithm has been used to generate or encrypt the data packet. In one exemplary embodiment, the hash algorithm can be used to encrypt the data communications, where some or all of the data contained in each packet or a group of packets is used to increment the algorithm, such that some or all of the history of data communicated between a remote device and the wireless server is required in order to decrypt the data communications. The algorithm then proceeds to 308.

At 308, it is determined whether the data communications lack the data field associated with the hash algorithm or otherwise reflect that the hash algorithm has not been used. If the suspect device has established data communications without utilizing the hash algorithm, the algorithm proceeds to 314, where offensive code is installed and activated at the suspect device, such as by replacing the BSP of the suspect device with an BSP that causes the suspect device to stop operating, to receive controls from the mobile wireless server or in other suitable manners. Otherwise, the algorithm proceeds to 310.

At 310, encapsulated artificial intelligence is applied to the data communications. In one exemplary embodiment, encapsulated artificial intelligence can be used to characterize data communications and processes of a mobile wireless server or other suitable devices, such as through the use of a levelling algorithm or in other suitable manners, to detect whether the use indicates that an unauthorized user has gained control of an authorized device, has copied an access control system or has otherwise obtained access to the mobile wireless server. The algorithm then proceeds to 312.

At 312, it is determined whether the suspect user is an unauthorized user. If so, then the algorithm proceeds to 314, otherwise the algorithm proceeds to 314 and the user is allowed to use the mobile wireless server and authorized data and services.

In operation, algorithm 300 allows hostile devices to be identified and isolated before they can access sensitive data of a mobile wireless server or other devices.

Figure 4:
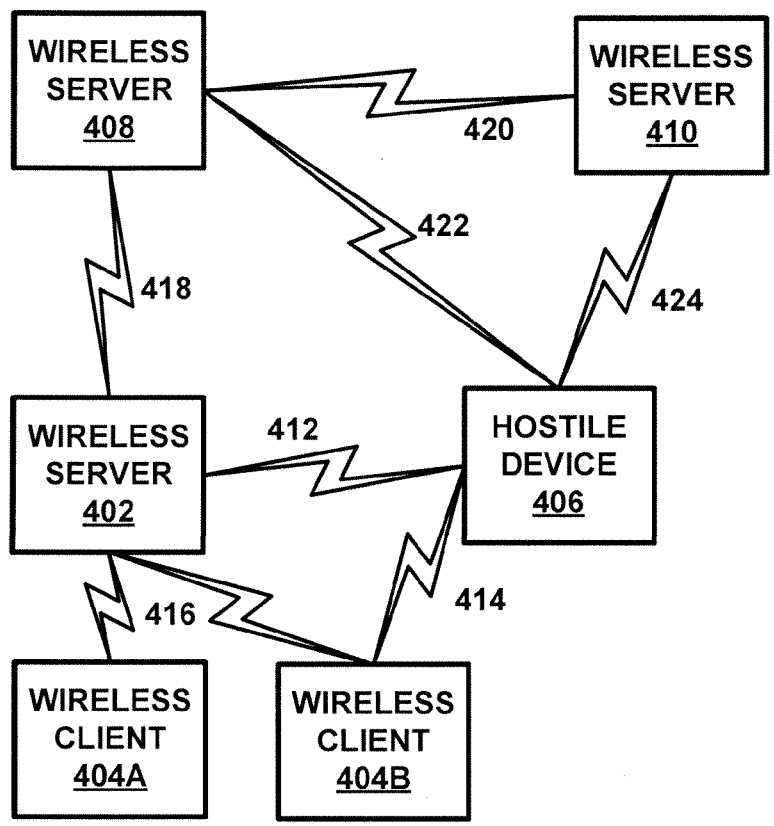
FIG. 4 is a diagram of a system 400 for identifying and neutralizing an offensive device, in accordance with an exemplary embodiment of the present disclosure.

FIG. 4 is a diagram of a system 400 for identifying and neutralizing an offensive device, in accordance with an exemplary embodiment of the present disclosure. System 400 can be implemented using a wireless server, such as those described in U.S. Pat. No. 8,922,590, issued Dec. 30, 2014, entitled "Augmented reality interface and method of use," which is hereby incorporated by reference for all purposes as if set forth herein in its entirety.

As shown in system 400, a wireless server 402 is configured to provide services to wireless client 404A and wireless client 404B. A hostile device can either attack wireless server 402 over communications link 412 or wireless client 404A and wireless client 404B over communications link 414, and wireless server 402 can use intrusion detection and protection system 102 to identify and neutralize hostile device 406. In addition, wireless server 402 can communicate identifying data for hostile device 406 to wireless server 408 over communications link 418, which can then communicate the identifying data to other wireless servers, such as wireless server 410 over communications link 420. Wireless server 408 can then use communications link 422 and wireless server 410 can then use communications link 424 to attack and neutralize hostile device 406.

For example, hostile device 406 can attempt to access wireless client 404B over communications link 414, and wireless server 402 can detect any attempted or actual access using intrusion detection and protection system 102, after which wireless server 402 can independently access hostile device 406 over communications link 412, over communications links 416 and 414 using wireless client 404B as an intermediary, or in other suitable manners.

Hostile device 406 can also attempt to access wireless server 402 over communications link 412, in which case wireless server 402 can independently access hostile device 406 over communications link 412, over communications links 416 and 414 using wireless client 404B as an intermediary, or in other suitable manners. Wireless server 402 can also coordinate attacks on hostile device 406, such as denial of service attacks using wireless servers 408 and 410 as well as other wireless servers, attacks using installed and activated offensive code or other suitable attacks. The attacks can be coordinated using wireless communications media, using Internet communications, or in other suitable manners.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data communications comprising:
   a port scan detector of a mobile wireless server platform configured to receive port access requests from a plurality of ports and to monitor an address of a sending device at each port of a plurality of ports of the mobile wireless server platform to determine whether the sending device is attempting to access each port and to generate port scan detection data;
   a decoy port system configured to receive the port scan detection data from the port scan detector and to open a designated decoy port in response to the port scan detection data; and
   a data packet hash manager configured to receive transmitted data from the sending device and to determine whether the sending device is utilizing a series of stored values that are continuously updated to encrypt the transmitted data.

2. The system of claim 1 further comprising an electronic encapsulated artificial intelligence system operating on the mobile wireless server platform and configured to receive a flag associated with the port scan detection data and to monitor the transmitted data from the sending device to determine whether the data communications are consistent with system parameters of a sending device that are associated with an authorized user.

3. The system of claim 1 wherein the port scan detector is configured to receive port access requests from a plurality of ports for a plurality of devices.

4. The system of claim 1 wherein the decoy port system is configured to open the designated decoy port.

5. The system of claim 1 further comprising a data packet hash manager.

6. The system of claim 1 further comprising an electronic encapsulated artificial intelligence system configured to monitor data communications from a sending device.

7. The system of claim 1 further comprising an electronic encapsulated artificial intelligence system configured to monitor data communications between a wireless client and the hostile device.

8. A method for data communications comprising:
   receiving port access requests from a plurality of ports of a mobile wireless server platform at a processor;
   determining with the processor whether a port scan by a sending device is in progress;
   opening a designated decoy port with the processor if the processor determines that the port scan by the sending device is in progress;
   receiving a series of data packets from the sending device;
   determining whether the series of data packets are encrypted with a series of stored values that are continuously updated; and
   generating a flag if the sending device is using the series of stored values that are continuously updated to encrypt the series of data packets.

9. The method of claim 8 further comprising:
   receiving the flag and to monitor data communications from the sending device.

10. The method of claim 8 further comprising
    controlling operation of the sending device if the sending device is the hostile device, and if the sending device is not using the series of stored values that are continuously updated to encrypt the series of data packets.

11. The method of claim 8 further comprising receiving port access requests from a plurality of ports for a plurality of devices.

12. The method of claim 8 further comprising opening the designated decoy port.

13. The method of claim 8 further comprising
    monitoring data communications from a sending device.

14. The method of claim 8 further comprising:
    monitoring data communications between a wireless client and the hostile device.

* * * * *